Nov. 2, 1965  H. PERRIN  3,214,991
MECHANISM FOR TRANSFORMING A MOVEMENT OF ROTATION
INTO A MOVEMENT OF TRANSLATION
Filed Feb. 19, 1963  2 Sheets-Sheet 1

INVENTOR
HERVÉ PERRIN

BY *Amster & Rothstein*
ATTORNEY

Nov. 2, 1965　　　　H. PERRIN　　　　3,214,991
MECHANISM FOR TRANSFORMING A MOVEMENT OF ROTATION
INTO A MOVEMENT OF TRANSLATION
Filed Feb. 19, 1963　　　　2 Sheets-Sheet 2
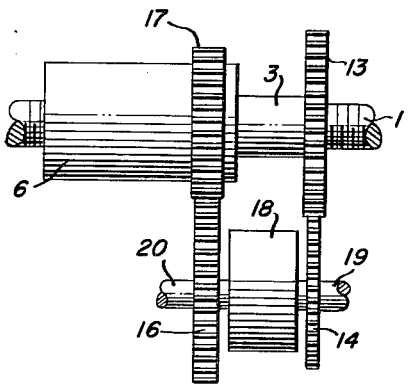
FIG. 3
FIG. 2
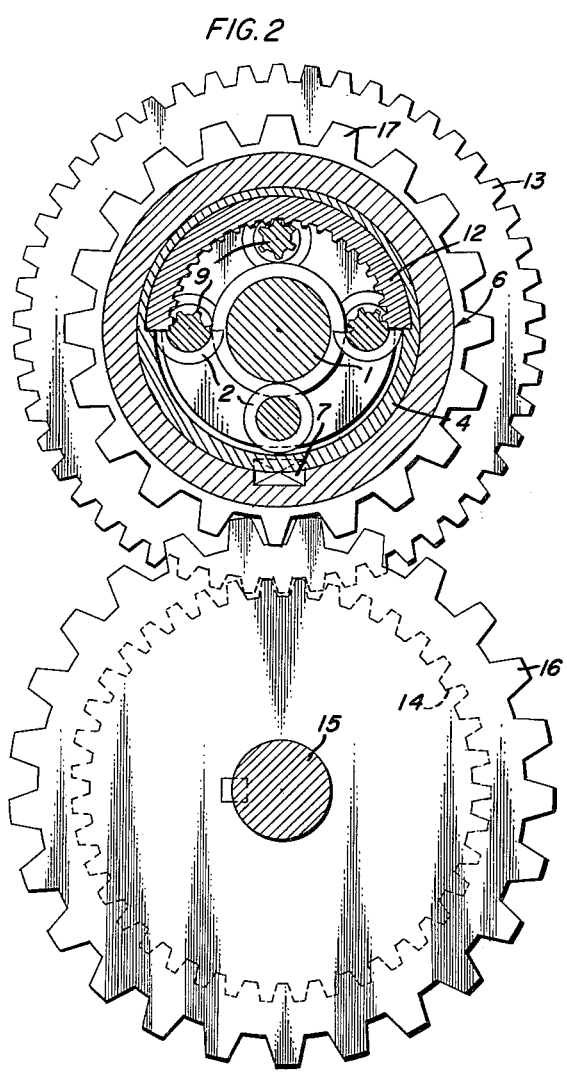
INVENTOR
HERVÉ PERRIN
BY
ATTORNEY

3,214,991
MECHANISM FOR TRANSFORMING A MOVEMENT OF ROTATION INTO A MOVEMENT OF TRANSLATION

Hervé Perrin, Neuilly sur Seine, France, assignor to La Technique Intégrale, Paris, France
Filed Feb. 19, 1963, Ser. No. 259,597
Claims priority, application France, Feb. 21, 1962, 888,694, Patent 1,326,402
3 Claims. (Cl. 74—424.8)

This invention is concerned with improvements in high-efficiency screw and nut devices of the type comprising, between a screw-threaded rod and an internally threaded socket, a plurality of screw-threaded rollers having a round thread profile engaging both the socket threads and the screw threads, these devices being adapted to transform with a considerable efficiency a movement of rotation into a movement of translation.

This invention relates more particularly to devices of the type in which the feed per revolution of the socket is extremely small and lower than the screw pitch, and wherein the roller threads have the same inclination as the threads of one of the two companion elements (screw or socket) between which these planet rollers are disposed, so that these rollers are not subjected to any longitudinal or axial displacement with respect to these two elements. Said planet rollers revolve about their axes and are rotatably mounted to this end on a cage or carrier disposed coaxially to the screw and socket, this cage revolving about the common axis of said screw and socket.

This device in which the socket pitch differs from the screw pitch provides a very small feed per revolution and is of the type termed as having a "constant differential pitch" when the planet rollers are formed along a relatively short axial length, as a substitute for the threads, with teeth meshing with other corresponding teeth cut in the top portion of the screw and socket threads. Thus, the respective positons are determined positively with respect to a graduated scale.

The manufacture of mechanisms of this type, involving the cutting of gear teeth on the screw, rollers and socket, is attended by considerable complication both in design and in the machining opeations. On the other hand, practical applications of devices of this character are rather limited both as to the permissible useful strokes and to the choice of the feed values per revolution.

It is the essential object of the present invention to avoid these drawbacks.

To this end the present invention provides a mechanism for transforming a movement of rotation into a movement of translation, which comprises threaded planet rollers interposed between a screw and nut-forming socket, and wherein the thread sides of the rollers have the same inclination as the threads of one of the two elements (screw or socket) between which said planet rollers are disposed, each roller being rotatably mounted on either end in a cage or carrier coaxial to said screw and socket, and being furthermore positively coupled or connected through a set of teeth to the element (screw or socket) having the same thread inclination as the rollers, whereby these rollers are not subjected to any longitudinal movement with respect to said element, the mechanism being characterized in that it comprises a transmission device of the positive-coupling type between said cage and the element (screw or socket) having the same thread inclination as the planet rollers, whereby the parasitic slipping of the planet rollers on the other element, that is, the element of which the thread sides have an inclination differing from that of the thread sides of the planet rollers, has a constant value.

The aforesaid cage may be driven through a set of teeth connected to the cage. In the case of a rotary socket wherein the roller thread sides have the same inclination as the socket thread sides, the socket and cage may be driven through a common shaft (or crankshaft).

Under these conditions, it is clear that the rotation of the cage about the screw and the rotation of the socket take place positively with respect to the screw held against rotation. On the other hand, since the rollers are positively connected to the socket, the assembly operates as if the rollers were positively connected to the screw. Thus, a high-efficiency and low feed per turn screw-and-nut device is obtained wherein the value of the resultant pitch will preserve a constant precision due to the elimination of any possibility of uncontrolled slip between the rollers and the element (namely the screw) moving in a direction parallel to the rollers axis with respect to the rollers themselves.

This assembly is characterized by two main features:

(a) The element of which the thread sides have an inclination differing from that of the roller thread sides has no teeth. Therefore, its manufacture is simplified and the useful stroke is not limited by the length of the teeth in meshing engagement.

(b) The wide range of gear ratios available for the sets of teeth permits of controlling the possible slip between elements moving longitudinally to each other.

According to a complementary feature of this invention, the motion transforming mechanism may comprise in the positive-coupling transmission device, an intermediate member for controlling on the one hand the rotation of said cake about the element having its thread sides inclined otherwise than the thread sides of the rollers, and on the other hand the rotation of the element having the same thread inclination as the rollers about the element having a different thread side inclination.

The mechanism according to this invention may comprise this intermediate member in case it is desired to obtain a controlled variation in the feed per revolution by using for instance, by way of intermediate member controlling said rotations, clutches, couplings, variable-speed gears, brakes, change-speed transmissions, etc., adapted to control the relative velocities of rotation of said cage and of said socket with respect to said screw and to each other.

With this complementary feature it is possible to obtain for example either a fast feed until the traction or compression working stress takes place and requires a slower feed per revolution, or a reversal of the direction in which this feed is applied, this reversal being controlled for example through an infinitely variable-speed gear.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

Other objects and advantages will become apparent from the following description taken in conjunction with the accompanying drawings in which:

FIGURE 2 is a section taken upon the line II—II of FIG. 1; and

FIGURE 3 is an elevational view showing a modified embodiment.

Figure 1:
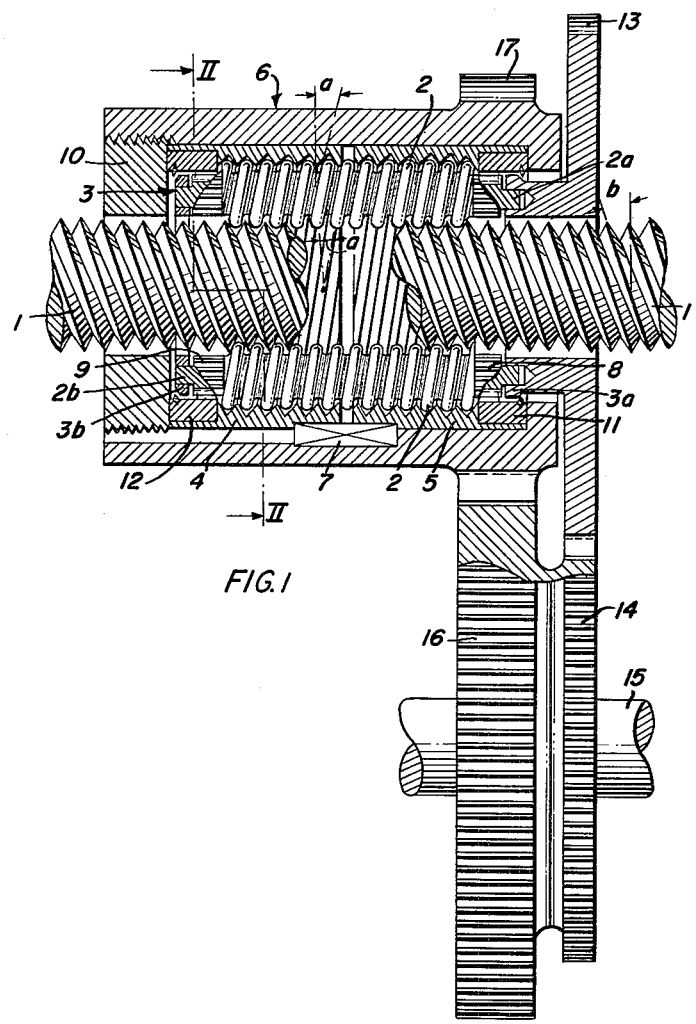
FIGURE 1 is a longitudinal sectional view showing a motion transforming mechanism constructed according to the teachings of this invention.

Referring first to FIGS. 1 and 2 of the drawings, the mechanism of this invention comprises a central screw 1 adapted to slide axially without rotating. This screw is in screw engagement with planet rollers 2 mounted in a cage or like carrier member 3. This cage 3 consists essentially of a pair of end rings 3a, 3b coaxial to the screw 1 and having journalled therein longitudinal end trunnions 2a and 2b, respectively, of said rollers 2. These rollers 2 are on the other hand in constant screw engagement with the inner threads of a socket 6 consisting actually of a pair of aligned nuts 4, 5 locked inside the socket 6 by means of a key 7 and a screw plug or ring 10 screwed on the socket 6.

In this specific form of embodiment the threads of the planet rollers 2 have the same inclination $a$ as those of the socket 6, this inclination differing from that $b$ of the screw threads 1.

The rollers 2 are provided on their longitudinal ends with sets of outer teeth 8, 9 meshing with the inner teeth of a corresponding pair of annuli 11, 12 locked on the nuts 4, 5 of socket 6, respectively.

According to this invention, the ring 3a of cage 3 is rigid with a toothed wheel 13 in meshing engagement with another toothed wheel 14 keyed on a shaft 15 having also keyed thereon another toothed wheel 16 meshing with the set of teeth 17 formed on the outer surface of socket 6.

This arrangement may constitute notably a mechanism providing a very small constant differential pitch with moderate constrained slip on a helical bearing with theoretically zero feed per revolution.

It is known that in a "constant differential pitch" device it is possible, by properly combining a number of threads on the different rollers, socket and screw elements, to obtain a mechanism in which the theoretical resultant pitch is zero.

If, as in the above-described case, the threads of rollers 2 have the same inclination $a$ as the threads of socket 6, the number of teeth of gears 13 and 14 can be selected with a view to produce a slight slip of controlled value between the rollers 2 and screw 1, so that a feed per revolution which may be very small can be obtained.

Typical embodiments of mechanisms constructed according to the principles set forth hereinabove will now be described by way of example.

In all the examples described hereinafter the thread sides of rollers 2 have the same inclination as the thread sides of socket 6.

The screw 1 has the following characteristics:

Pitch diameter—$D_1$
Thread dimension—$f$
Number of threads—$N_1$ ($N_1$ with the sign + for a right-handed screw and − for a left-handed screw)
Screw pitch $P_1$—$N_1.f$ Characteristics of roller 2:

Pitch diameter—$d$
Thread dimension—$f$
Number of threads—$n$ ($n$ with the sign + for a right-handed screw and − for a left-handed screw)
Roller pitch—$p=f.n$ Characteristics of socket 6:

Pitch diameter—$D_2$
Thread dimension—$f$
Number of threads—$N_2$ ($N_2$ with the sign + for a right-handed screw and − for a left-handed screw)
Socket pitch—$P_2=N_2.f$ The following relationship is established between the roller characteristics and the threaded socket characteristics, as a consequence of the equality of the thread inclinations $a$:

$$\frac{D_2}{d}=\frac{N_2}{n}$$

For one revolution of the socket, a simple calculus will prove that cage 3 should revolve by $$\frac{N_2}{2(N_2-1)}$$

so that the resultant pitch will be given by the formula $$P=\frac{P_1D_2+P_2D_2}{D_1+D_2}$$

if:

$j_1$=number of teeth of set 17 on socket 6
$j_2$=number of teeth of wheel 16 meshing with the set of teeth 17 on socket 6
$j_3$=number of teeth of wheel 16 solid with cage 3
$j_4$=number of teeth of wheel 14 meshing with wheel 13, the following equality must be obtained:

$$\frac{j_1.j_4}{j_2.j_3}=\frac{N_2}{2(N_2-1)}$$

Three practical examples of the manner in which the invention may be carried out in practice will now be described.

(I) Case of a bearing having a constant differential pitch with the following basic values:

$D_1$=14 millimeters
$f$=1.5 mm.
$N_1$=4 mm.
$N_2$=4 mm.
$d$=7 mm.
$P$=resultant feed per revolution=2 mm.

to ensure a constant value of the resultant feed the following equality is required:

$$\frac{j_1.j_4}{j_2.j_3}=\frac{2}{3}$$

which may be obtained for example as follows:

$$\frac{20}{24}.\frac{40}{50}$$

$j_1$=20 teeth externally of socket 6 (teeth 17)
$j_2$=24 teeth on wheel 16
$j_3$=50 teeth on wheel 13
$j_4$=40 teeth on wheel 14

(II) Case of a bearing having a so-called "zero-controlled" constant differential pitch (very low and constant feed per revolution):

A theoretically zero feed per revolution device is selected, wherein $$P=\frac{P_1D_2+P_2D_1}{D_1+D_2}=0$$

For example, if:

$D_1$=27 mm.
$D_2$=45 mm.
$N_2$=5
$N_1$=3
$f$=1 mm.
$P_1$=3 mm.
$P_2$=5 mm.

$$P=\frac{-3\times 45+5\times 27}{27\times 45}=\frac{-135+135}{72}=0$$

To produce a very small feed during a slight controlled slipping of the roller threads on the screw threads, toothed wheels are taken in this case which provide a ratio substantially close to $$\frac{N_2}{2(N_2-1)}$$

It can easily be proved that in this case the feed per revolution is $$\left(\frac{N_2}{2(N_2-1)}-\frac{j_1}{j_2}\times\frac{j_4}{j_3}\right)2(N_2-1)f$$

$f$ being the thread dimension.

With 1-millimeter threads, a .01 millimeter feed per revolution can be obtained. Since the socket 6 has five threads ($N_2=5$), we have:

$$\frac{N_2}{2(N_2-1)}=\frac{5}{8}$$

Taking now $$\frac{j_1}{j_2}\times\frac{j_4}{j_3}=\frac{20}{25}\times\frac{39}{50}$$

the feed per revolution of the nut will be:

$$P=\left(\frac{5}{8}-\frac{20}{25}\times\frac{39}{50}\right)\times 2(5-1)\times 1=8\left(\frac{5}{8}-\frac{78}{125}\right)$$

therefore, $P=.008$ mm.

and a feed per revolution of $$\frac{j_2}{j_1}\times P=\frac{25}{20}\times\frac{1}{125}=.01 \text{ mm.}$$

will be obtained.

There only remains to find the radius of the rounded portion of the threaded roller which ensures the minimum slip between the screw and roller.

Thus, high-efficiency screw and socket mechanisms can easily be constructed wherein a very low constant differential pitch is combined with a very moderate controlled slip.

A same train of gears drives the rotary socket and the cage, thus determining the value of the slip produced between the rollers and screw.

A device of this character is advantageous mainly for constructing high-efficiency screw-and-nut mechanisms producing a very small feed per revolution, for use either in precision machine tools (milling machines, jig-boring machines, grinders, etc.) or in non-reversible hydraulic cylinders without any intermediate reducing gear.

(III) Case of helical bearings with variable and controlled differential pitch:

(a) Taking the first example cited hereinabove:

$N_1=4$
$N_2=-4$
$f=1.5$ mm.

it has been explained that with $j_1=20$ teeth
$j_2=24$ teeth
$j_3=50$ teeth
$j_4=40$ teeth a 2-mm. constant resultant feed per revolution is obtained.

However, if for example between wheels 14 and 15 mounted on two separate shafts 19 and 20 a transmission member 18 (FIG. 3) is interposed which permits the direct coupling of cage 3 and socket 6 with each other, this cage having in this case no relative movement with respect to the socket, a resultant feed per revolution is obtained which is equal to the screw pitch, that is, $4\times 1.5$ mm.$=6$ mm.

If the device 18 between cage 3 and socket 6 is a clutch, a coupling, an infinitely-variable speed gear, a change-speed mechanism, etc., permitting slipping movements prior to the complete solid coupling of cage 3 with socket 6, it will be seen that a variable and possibly controlled feed per revolution of 2 to 6 millimeters can be obtained.

(b) In the second example, it was shown hereinabove that when gears 14 and 16 are positively interconnected, a feed of screw 1 of .008 mm. per revolution of socket 6 can be obtained. If gears 14 and 16 are disconnected from each other while causing cage 3 to be rotatably coupled with socket 6 so as to revolve at the same speed as this socket, the feed per revolution of the nut will equal the screw pitch, that is $-3$ mm., in a direction opposite to the preceding one. In this case, with a variable-slip coupling 18 a continuously controlled change in the direction of feed can be obtained, this feed ranging from $+.008$ to $-3$ mm.

What I claim is:

1. A mechanism for transforming a movement of rotation into a movement of translation which comprises a screw, a coaxial internally threaded socket, the threads of said screw and socket having different inclinations, threaded planet rollers interposed between said screw and socket, the threads of said planet rollers having the same inclination as the threads of said socket, a cage coaxial to said screw and socket, each planet roller being rotatably mounted on said cage, a first set of inner teeth formed in said socket, and another set of outer teeth formed on each one of said planet rollers and in constant meshing engagement with said first set of inner teeth of said socket, whereby said planet rollers cannot move axially relative to said socket, and positive-coupling transmission means interposed between said cage and said socket, so that the parasitic slip of said planet rollers on said screw has a constant value.

2. Mechanism as set forth in claim 1, comprising a toothed wheel rigid with said cage, a set of outer teeth formed on said socket and a train of gears connecting said set of outer teeth of said socket to said toothed wheel.

3. Mechanism as set forth in claim 1, wherein said positive-coupling transmission means comprise an intermediate member adapted to vary the transmission ratio between said cage and said socket.

References Cited by the Examiner
UNITED STATES PATENTS 2,476,584 7/49 Clark.
2,683,379 7/54 Strandgren.

FOREIGN PATENTS 373,077 5/32 Great Britain.

DON A. WAITE, *Primary Examiner.*